United States Patent [19]

Hulsing, II

[11] Patent Number: 4,821,572
[45] Date of Patent: Apr. 18, 1989

[54] MULTI AXIS ANGULAR RATE SENSOR HAVING A SINGLE DITHER AXIS

[75] Inventor: Rand H. Hulsing, II, Redmond, Wash.

[73] Assignee: Sundstrand Data Control, Inc., Redmond, Wash.

[21] Appl. No.: 125,220

[22] Filed: Nov. 25, 1987

[51] Int. Cl.[4] .............................................. G01P 9/04
[52] U.S. Cl. ..................................... 73/505; 73/510
[58] Field of Search ............. 73/504, 505, 510, 517 R

[56] References Cited

U.S. PATENT DOCUMENTS

| | | | |
|---|---|---|---|
| 2,514,250 | 7/1950 | Meredith | 73/505 |
| 4,445,376 | 5/1984 | Merhav | 73/510 |
| 4,510,802 | 4/1985 | Peters | 73/505 |
| 4,522,062 | 6/1985 | Peters | 73/505 |
| 4,590,801 | 5/1986 | Merhav | 73/510 |
| 4,703,654 | 11/1987 | Ficken et al. | 73/504 |

FOREIGN PATENT DOCUMENTS 2151022A of 0000 United Kingdom .

Primary Examiner—John Chapman
Attorney, Agent, or Firm—Christensen, O'Connor, Johnson & Kindness

[57] ABSTRACT

A Coriolis rate sensor for determining both angular rate and linear acceleration with respect to three orthogonal axes. A first embodiment of the rate sensor (10) includes three pairs of accelerometers (26, 28, and 30) mounted on counter-rotating frame members (20, 22). The accelerometers are mounted with their sensitive axes antiparallel with each other, forming an acute angle with the common axis (40) about which the upper and lower frame members are counter-rotated back and forth in a dither motion. The upper and lower frame members are connected to a baseplate (12) by flex links (32), which are aligned radially about the axis. The flex links provide a relatively rigid support (in compression) between the frame members and the centrally disposed baseplate, yet readily permit counter-rotation of the two frame members. A link (56) prevents all but relative rotational movement between the frame members and baseplate. A pair of electromagnetic coils (42) and pole pieces (50) provide a sinusoidal driving force to counter-rotate the upper and lower frame members relative to each other to ensure that the upper and lower frame members are directly coupled to each other and to the baseplate. In a second embodiment of the rate sensor (100), eight accelerometers (102, 104, 106 and 108) are mounted with two pairs on an upper counter-rotating member and two pairs on a lower counter-rotating member.

47 Claims, 6 Drawing Sheets

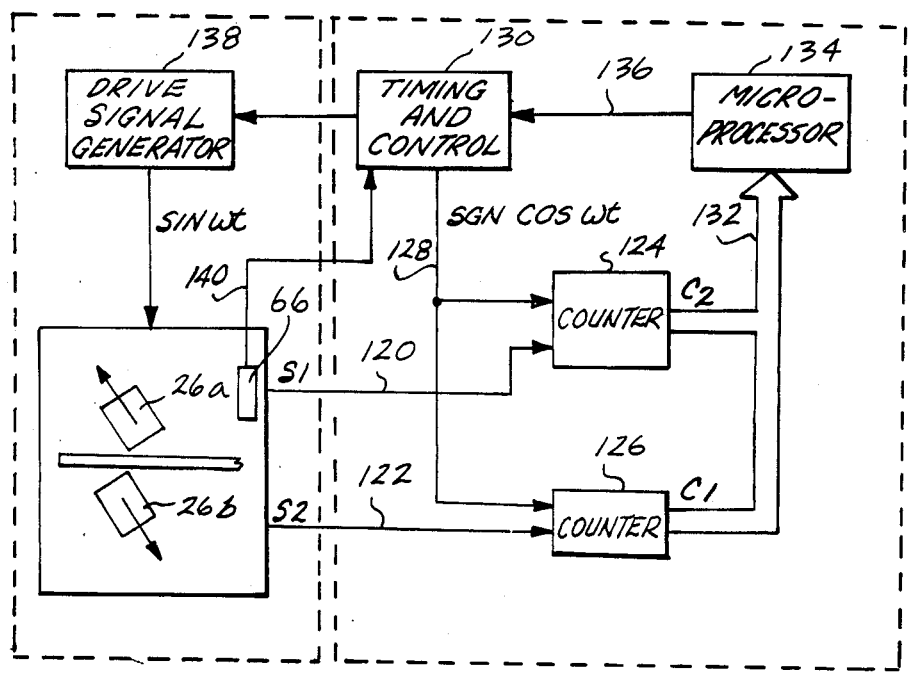
*Fig. 13.*
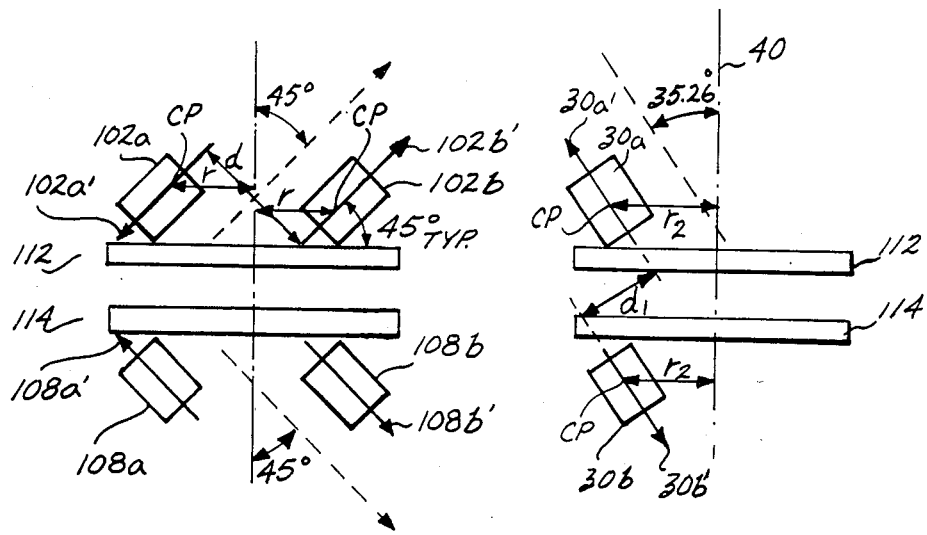
*Fig. 11.*   *Fig. 12.*

MULTI AXIS ANGULAR RATE SENSOR HAVING A SINGLE DITHER AXIS

FIELD OF THE INVENTION

The present invention is directed to an apparatus and method for sensing acceleration and angular rate of rotation of a body, wherein such apparatus includes a plurality of accelerometers used for measuring the linear acceleration and angular rate of rotation of the body with respect to three orthogonal axes.

BACKGROUND OF THE INVENTION

The rate of rotation of a body about an axis may be determined by mounting an accelerometer on a moving frame, with the accelerometer's sensitive axis and the directon of motion of the frame both normal to the rate axis about which rotation is to be measured. For example, consider a set of orthogonal axes, X, Y and Z fixed in a body. Periodic movement of an accelerometer along the Y axis of the body with its sensitive axis aligned with the Z axis results in the accelerometer experiencing a Coriolis acceleration directed along the Z axis as the body rotates about the X axis. The acceleration or force acting on the accelerometer is proportional to a change in velocity of the body along the Z axis and its angular rate of rotation about the X axis. An output signal from the accelerometer thus includes a DC or slowly changing component representing the linear acceleration of the body along the Z axis, and a periodic component representing the Coriolis acceleration resulting from rotation of the body about the X axis.

In a similar manner, two accelerometers mounted with their sensitive axes aligned with the X and Y axes, and driven in a periodic motion along the Z and X axes, respectively, yield the magnitude of linear acceleration along the X and Y axes and the angular rate about the Y and Z axes. The processing of the output signals from the accelerometers to obtain angular rate and linear acceleration along the three orthogonal axes is described in commonly assigned U.S. Pat. Nos. 4,445,376, and 4,590,801.

In U.S. Pat. No. 4,510,802, a preferred embodiment of a rotational rate sensor is disclosed in which two accelerometers are mounted in a parallelogram structure with their sensitive axes parallel or antiparallel. The two accelerometers are vibrated back and forth in a direction substantially normal to their sensitive axes. An electromagnetic D'Arsonval coil mounted at one side of the parallelogram structure is energized with a periodically varying current, attracting a pole piece that is attached to the parallelogram structure. The varying magnetic attractive force of the coil causes the structure to vibrate, dithering the accelerometers back and forth. A signal processor connected to the pair of accelerometers combines their output signals, deriving both a rate signal and a linear acceleration signal.

Three such dithering parallelogram frame structures, wherein the sensitive axes of the associated accelerometer pairs are aligned along orthogonal axes, may be used to fully define the linear acceleration and angular rate of rotation experienced by a body. Although it is possible to build a relatively compact three axis rate sensor comprising three separate rate sensors of the above-described design, the total volume of three parallelogram structures may exceed the space available in certain applications. In addition, the cost of such a device may be prohibitive for a particular use.

Alternatives to the parallelogram frame structure for mounting a plurality of accelerometers are described in U.S. Pat. Nos. 4,445,376 and 4,522,062. The first of these patents discloses a triad of accelerometers, each mounted on a disk rotating about one of three orthogonal axes. The cost of the slip-rings required for this approach, and the electrical noise generated by the intermittency of a slip-ring contact limit the practical application of this design. In the other patent, a pair of accelerometers is mounted on a disk that dithers about a central axis. In one embodiment, the sensitive axes of the two accelerometers are aligned in parallel with the central dither axis and, in another embodiment, the two accelerometers are mounted on the disk back-to-back, with their sensitive axes radialy aligned normal to the dither axis. Because the pointing direction of their sensitive axes is continually changing as the accelerometers rotate back and forth, the signal produced by the pair of accelerometers has an undesirable cross-axis vibration sensitivity, i.e., vibrations in a direction nonaligned with the sensitive axis couple into the accelerometer's output signal as an error component. In addition, angular acceleration of the base on which the rotating disk is mounted tends to induce a natural resonance mode of the dithering disk, degrading the performance of the rate sensor. Neither of the rotating accelerometer techniques disclosed in these two patents substantially reduces the cost and size of a three-axis rate sensor, since a separate dither drive is required to determine rate about each orthogonal axis of interest.

It is thus an object of the present invention to provide a compact, lightweight and relatively low-cost three-axis rate sensor. A further object is to provide a rate sensor that is accurate and relatively insensitive to cross-axis vibrations and natural resonance mode excitation. These and other objects and advantages of the present invention as compared to the prior art rate sensors will be apparent from the attached drawings and the Description of the Preferred Embodiments that follows.

SUMMARY OF THE INVENTION

In accordance with the present invention, an apparatus and method for sensing angular rate of rotation about each of a plurality of axes are disclosed. The apparatus includes a supporting base to which are pivotally connected a first and a second frame member. The frame members are free to rotate about a common axis. Mounted on the first and second frame members are a plurality of pairs of accelerometers, each accelerometer having an acceleration sensitive axis. Each pair of accelerometers is associated with one of a plurality of prime axes about which the angular rate of rotation is sensed. The pairs of accelerometers are mounted on the first and second frame members so that the acceleration sensitive axes of the two accelerometers comprising a pair are generally in parallel alignment.

Driving means are operative to counter-rotate the first and the second frame members in opposite directions about the common axis without transmitting a reaction force to the supporting base. The counter-rotating motion of each pair of accelerometers about the common axis causes them to experience a Coriolis acceleration proportional to the angular rate of rotation about the prime axis with which the pair of accelerometers is associated, and each accelerometer of the pair produces an output signal that is a function of the Coriolis acceleration. Signal processing means connected to the accelerometers are operative to determine the angular rate of rotation about each of the prime axes, and are further operative to determine a linear acceleration along each of the three orthogonal prime axes.

In the preferred embodiment, the driving means include first and second electromagnetic coils and pole pieces. The electromagnetic coils and their associated pole pieces are connected to one of the first and second frame members, an electromagnetic coil being attached to one frame member and the pole piece to the other frame member. A periodically varying current sequentially energizes the first and second electromagnetic coils so that the frame members dither back and forth, in counter-rotation relative to each other.

The apparatus further includes means for sensing an angular displacement of the first frame member relative to the second and for producing a signal indicative of the angular displacement. Drive control means, connected to receive the signal indicative of angular displacement are operative to control the amplitude and phase of the periodically varying current used to energize the first and second electromagnetic coils, as a function of that signal.

The supporting base includes a baseplate and a plurality of flexures that connect the baseplate to the first and second frame members, at spaced apart points around the common axis. The flexures comprise elongate flat strips, which have a surface aligned with a common axis and which extend between the first and second frame members, opposite ends of each strip being connected thereto. An intermediate point of the flexible strips is connected to the baseplate. The baseplate includes a plurality of tabs that extend radially outward relative to the common axis. These tabs are adapted to connect to a body subject to rotation about the prime axes.

In one embodiment, both accelerometers of a pair are mounted on the same frame member. In another embodiment, one accelerometer of each pair is mounted on the first frame member and the other is mounted on the second frame member. One embodiment includes eight accelerometers, and another six.

In another embodiment, the prime axes define orthogonal planes in which lie the acceleration sensitive axes of the accelerometers.

In yet another embodiment, the prime axes are defined by the acceleration sensitive axes.

BRIEF DESCRIPTION OF THE DRAWINGS

FIG. 11 is a diagram illustrating important dimensional considerations in the disposition of the accelerometers in the second embodiment;

FIG. 12 is a diagram illustrating important dimensional considerations in the disposition of accelerometers in the first embodiment; and FIG. 13 is a block diagram of the rate sensor and signal processing apparatus.

DESCRIPTION OF THE PREFERRED EMBODIMENTS

Figure 1:
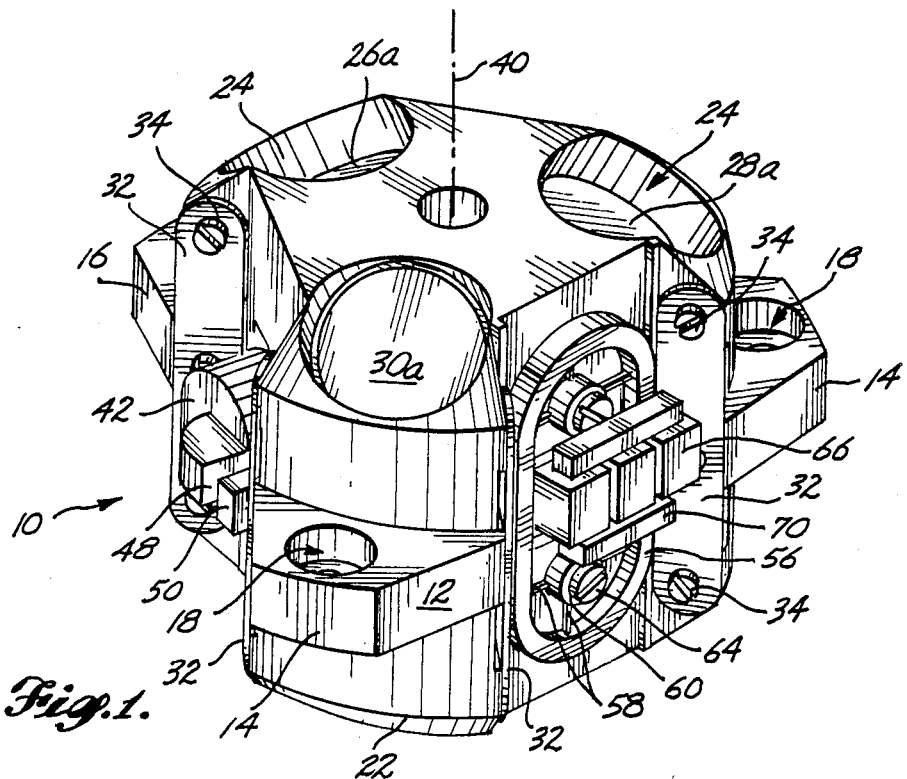
FIG. 1 is an isometric view of a first embodiment of the present invention, in which six accelerometers are dithered about a common axis to measure angular rate and linear acceleration with respect to three orthogonal axes (mounting brackets for externally attached elements are omitted for clarity)
Figure 2:
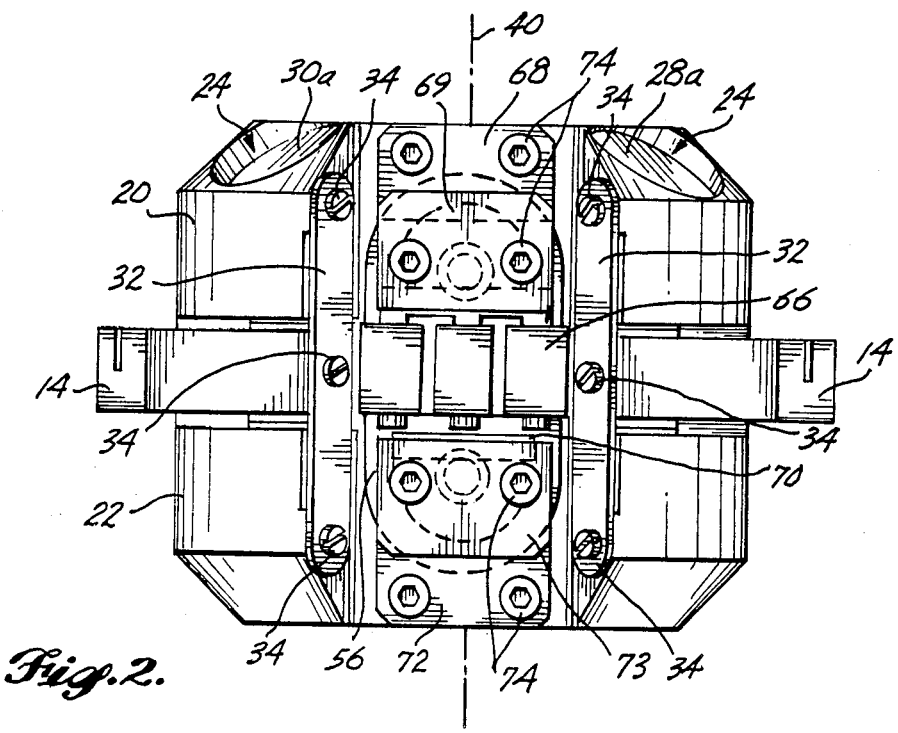
FIG. 2 is a side elevational view of the first embodiment shown in FIG. 1.
Figure 3:
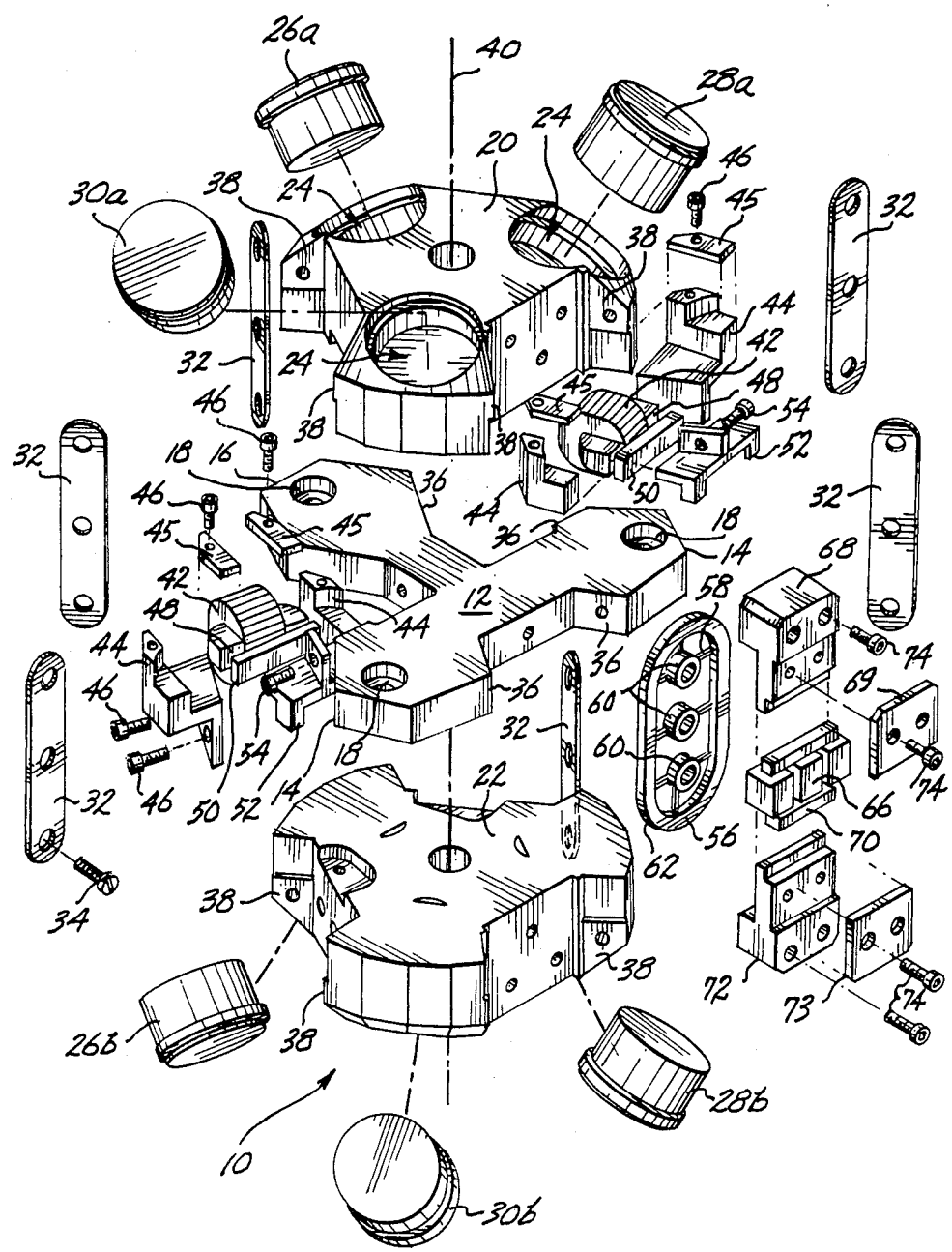
FIG. 3 is an exploded view of the first embodiment of the present invention.

A first preferred embodiment of a rate sensor, generally denoted by reference numeral 10, is illustrated in detail in FIGS. 1-5. Because the rate sensor is extremely compact (less than 2 inches in diameter in the preferred embodiment), the exploded view of FIG. 3 is perhaps most helpful in showing the elements of the rate sensor, while the other drawing figures may be referred to for a better understanding of how these elements are assembled. As shown in FIG. 3, rate sensor 10 includes a baseplate 12, which is generally formed in the shape of a "T". The top portion of the "T" comprises two symmetric outwardly extending tabs 14, while the vertical portion includes a third outwardly extending tab 16. Baseplate 12 is sized so that tabs 14 and 16 extend beyond the circumference of the remainder of the rate sensor, exposing three mounting holes 18 formed in the outer ends of the tabs. Mounting holes 18 thus adapt baseplate 12 for attachment to a moving body by use of a suitable fastener, enabling measurement of the linear acceleration and angular rate of rotation to which the body is subject, with respect to three orthogonal axes.

Rate sensor 10 further includes an upper frame member 20 and lower frame member 22, each of which have a generally hemispherically shaped external surface, although the sides of each of the frame members 20 and 22 are relieved forming indented flat areas at three spaced-apart locations around their circumference. The outer top surface of upper frame member 20 includes three ports 24, which are sized to accommodate accelerometers 26a, 28a and 30a. Ports 24 are formed in upper frame member 20, and are directed outwardly at an acute angle relative to an axis 40 that extends through the center of the upper frame member. The angle formed between each of the centerlines of ports 24 and axis 40 is preferably equal to 35.26°; the significance of this angle is discussed hereinbelow.

The lower frame member 22 also includes three ports 25 similarly sized to accommodate accelerometers 26b, 28b and 30b (see FIG. 5), and are angled inwardly toward that axis, as it extends through lower frame member 22. The centerlines of ports 25 define an acute angle with axis 40 equal to that similarly defined by the centerlines of ports 24.

Accelerometer 26a is mounted in one of the ports 24 with its sensitive axis aligned along the centerline of that port and antiparallel to the sensitive axis of accelerometer 26b, which is mounted in one of the ports 25. Similarly, accelerometers 28a and 30a have their sensitive axes in antiparallel alignment with the sensitive axes of accelerometers 28b and 30b, respectively. The six accelerometers 26, 28 and 30 thus comprise pairs of accelerometers wherein one accelerometer of a pair is mounted on the upper frame member 20 and the other is mounted on the lower frame member 22. Although it is preferable that the accelerometers be mounted with their sensitive axes in antiparallel alignment, the present invention is equally applicable to pairs of accelerometers mounted with their sensitive axes in parallel alignment, simply by inverting the output signal of one of the accelerometers. The term "parallel", as used in the claims, is intended to encompass both the arrangement in which each accelerometer of a pair has its positive sensitive axis aligned and pointing generally in the same direction as the other, and that described above wherein the sensitive axes are aligned and are pointing generally in opposite directions, i.e., both the more specifically defined parallel and anti-parallel arrangements.

Upper frame member 20 is connected to baseplate 12 and to lower frame member 22 by six flex links 32, formed of elongate, relatively thin sheet metal strips. Flex links 32 extend between the upper and lower frame members 20 and 22, and are connected thereto and to baseplate 12 using screws 34 or other suitable fasteners. (In FIG. 3, only a single exemplary screw 34 is shown for simplicity). A plurality of flat surfaces 36 are formed on the sides of tabs 14 and 16 of baseplate 12, in radial alignment with axis 40, providing a flat mount on which the center portion of flex links 32 may be attached. Similarly, a plurality of radially aligned flat surfaces 38 are formed on the upper and lower frame members 20 and 22 for attachment of the upper and lower ends of flex links 32. Surfaces 38 are elevated relative to the adjacent portion of the frame members to provide a clearance so that the flex links may bend cross-axis to a limited extent without interference. Since they are radially aligned, flex links 32 may bend cross-axis, permitting the upper and lower frame members to rotate slightly about axis 40, relative to fixed baseplate 12. However, they are relatively stiff or rigid under compressive loads directed along or parallel to axis 40. Their radial alignment relative to axis 40 resists almost any other mode of motion relative to baseplate 12 except rotation about axis 40. The fact that flex links 32 provide the required rotational freedom yet are very resistant to other relative motions between the upper and lower frame members and the baseplate provide a substantial advantage compared to prior art rate sensors. The symmetry, axial stiffness, and radial alignment of the flex links helps to prevent cross-axis accelerations to which baseplate 12 is subject, from coupling into the signal output from the pairs of accelerometers as an error component.

Figure 4:
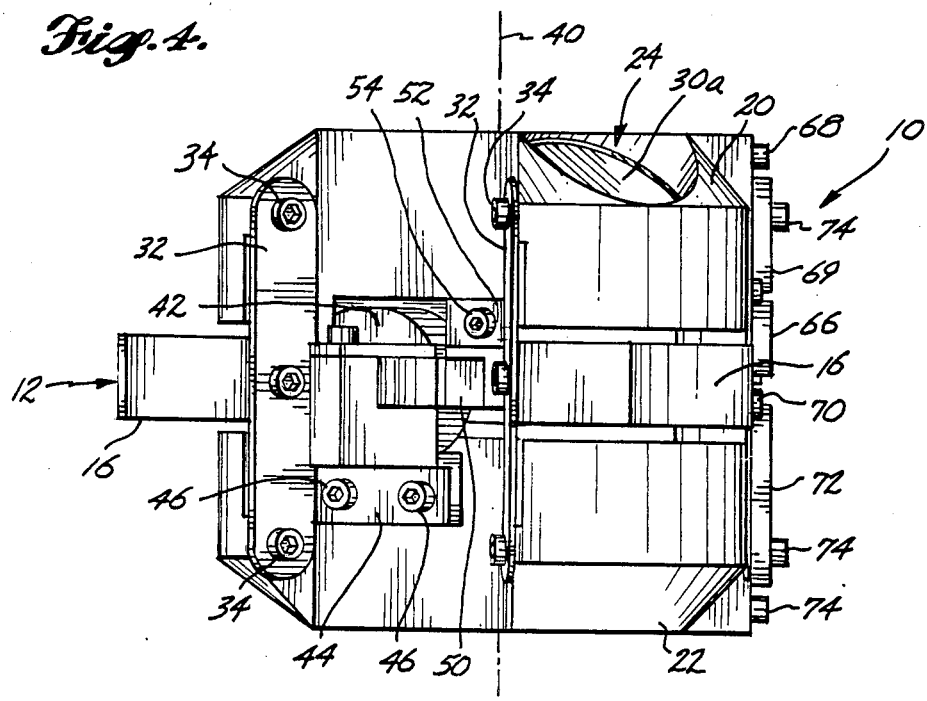
FIG. 4 is a side elevational view showing an electromagnetic coil and pole piece used to drive the rate sensor in accordance with the present invention.
Figure 5:
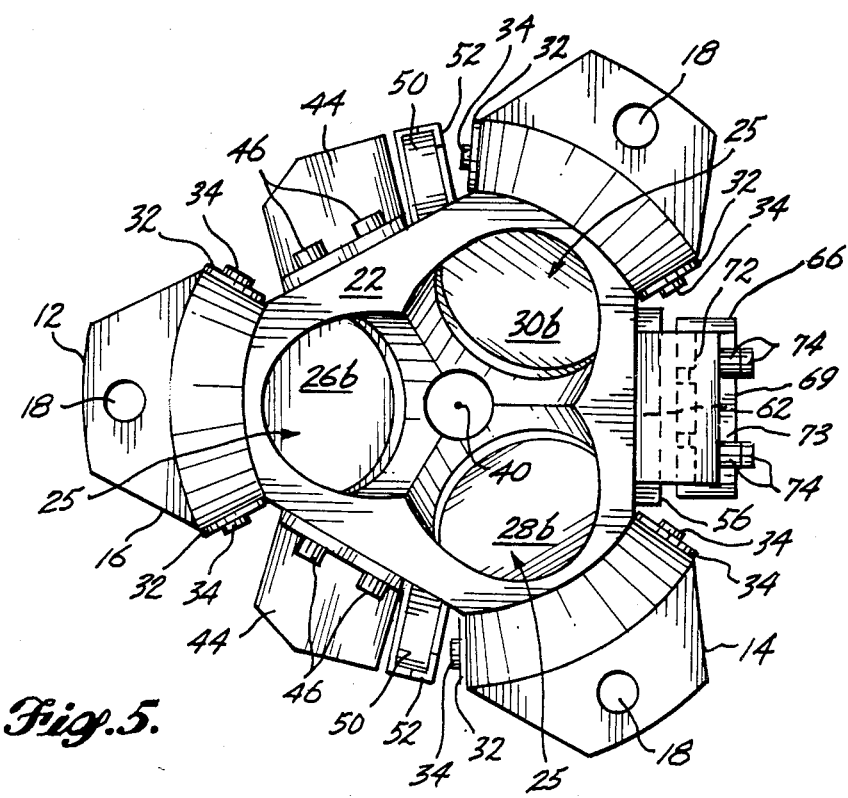
FIG. 5 is a plan view of the first embodiment, showing the lower portion of the rate sensor.

An electromagnetic coil 42 is mounted in two of the recessed portions of baseplate 12 and of upper and lower frame members 20 and 22. The electromagnetic coils provide a driving force that counter-rotates upper frame member 20 relative to lower frame member 22. The disposition of electromagnetic coils 42 is illustrated in FIG. 4, and partially in FIG. 1. A "C-shaped" core (not separately referenced by number) within electromagnetic coil 42 includes a pole face 48 at each end, which is disposed opposite a bar-shaped pole piece 50. Electromagnetic coil 42 is attached to the lower frame member 22 with the bracket 44, using bolts 46, or other suitable fasteners. A plate 45 clamps the electromagnetic coil 42 in place on bracket 44, mounting it rigidly to the lower frame member. Another bracket 52 is used to mount pole piece 50 to the upper frame member 20, using bolts 54 or other suitable fasteners. As shown in FIG. 3, electromagnetic coils 42 are disposed with their pole faces 48 facing in opposite directions relative to axis 40. Accordingly, one of the electromagnetic coils 42 is energized during a first half cycle of a sinusoidally varying drive signal, and the other electromagnetic coil 42 during the second half, so that upper and lower frame members 20 and 22 are caused to rotate relative to baseplate 12 and to counter-rotate relative to each other through a relatively small incremental angle. Axis 40 thus comprises a dither axis about which accelerometer pairs 26, 28 and 30 are counter-rotated back and forth in a rotational dither motion. The dither motion causes the accelerometers to experience Coriolis forces as the body to which the rate sensor 10 is attached is subject to angular rotation. In addition, accelerometers 26, 28 and 30 respond to linear acceleration in alignment with their sensitive axes, thereby producing a signal which includes components of both Coriolis acceleration, i.e., angular rate, and of linear acceleration.

If only flex links 32 connected the upper and lower frame members 20 and 22 to baseplate 12, it is possible that the upper frame member 20 might rotate relative to the baseplate 12 out of synchronization with lower frame member 22, due to vibration or other external force that are not transmitted to the lower frame member. For this reason, a link 56 is provided, which extends between upper frame member 20 and lower frame member 22 in the third indented flat area of those elements. Link 56 includes an open oval frame 62 having three spaced apart hubs 60 disposed in its interior, which are connected by means of flexible struts 58 to the inside surface of the frame. Each of the hubs 60 are connected to one of the upper frame member 20, baseplate 12, and lower frame member 22 using screws 64, or other suitable fasteners. As upper frame member 20 dithers relative to baseplate 12, it causes the flexible struts 58 to experience a bending moment, deforming them slightly in an "S" shape. This deformation causes the frame 62 to rotate about the center hub 60, forcing the lower frame member 22 to rotate in the opposite direction relative to the upper frame member 20. As a result, link 56 permits only equal and opposite rotations of the upper and lower frame members 20 and 22 with respect to the baseplate. Thus angular acceleration of baseplate 12 is coupled to the upper and lower frame members without exciting the natural resonant frequency of either, since they are mechanically connected together through link 56. In addition, link 56 ensures that any rotational motion or vibration affecting one of the upper and lower frame members also affects the other.

Rate sensor 10 also includes a dither motion sensor for determining the amplitude and phase relationship of the dither motion followed by the upper and lower frame members 20 and 22 as they counter-rotate back and forth relative to each other. That sensor comprises an "E-coil" 66, which is attached to the upper frame member 20 using a bracket 68 and plate 69. A pole piece 70 is mounted adjacent to the "E-coil" with a bracket 72 that is attached to the lower frame member 22 using bolts 74, or other suitable fasteners, and a plate 73. Brackets 68 and 72 extend outwardly to mount the "E-coil" 66 and pole piece 70 so that they clear the surface of link 56. As the upper frame member 20 dithers back and forth relative to the lower frame member 22, the "E-coil" 66 and pole piece 70 move relative to each other, changing the coupling between a plurality of coils comprising the "E"-shaped core of the coil, producing an electrical feedback signal indicative of the amplitude of the dither motion. This feedback signal is used to control the amplitude and phase relationship of the drive signal applied to electromagnetic coils 42.

Since the upper and lower frame members 20 and 22 are counter-rotated relative to each other, electromagnetic coils 42 and pole pieces 50 comprise a reactionless drive, in which the inertial moment of the upper frame member 20 cancels the inertial moment of the lower frame member 22. Consequently, no torque or vibration is transmitted to baseplate 12 or to the body to which it is attached. This provides a substantial advantage compared to prior art vibrating and rotating rate sensor structures, which may induce vibration into the body to which they are connected. Such vibrations may also cause cross-coupling errors between pairs of accelerometers in a three axes rate sensor of the prior art vibrating and rotating types. In the present invention, all of the accelerometers are dithered in synchronization at a common dither frequency, about a common dither axis 40. The synchronized signals they produce are therefore easier to process, and provide angular rate and linear acceleration data subject to few of the errors that troubled prior art schemes in which accelerometers either individually or in pairs were rotated in a single direction about an axis. Since accelerometers 26, 28 and 30 are dithered through a very small angle about dither axis 40, leads (not shown) may be easily attached directly to the accelerometers. Slip rings or other noise inducing electrical contacts are not required.

Figures 6, 7:
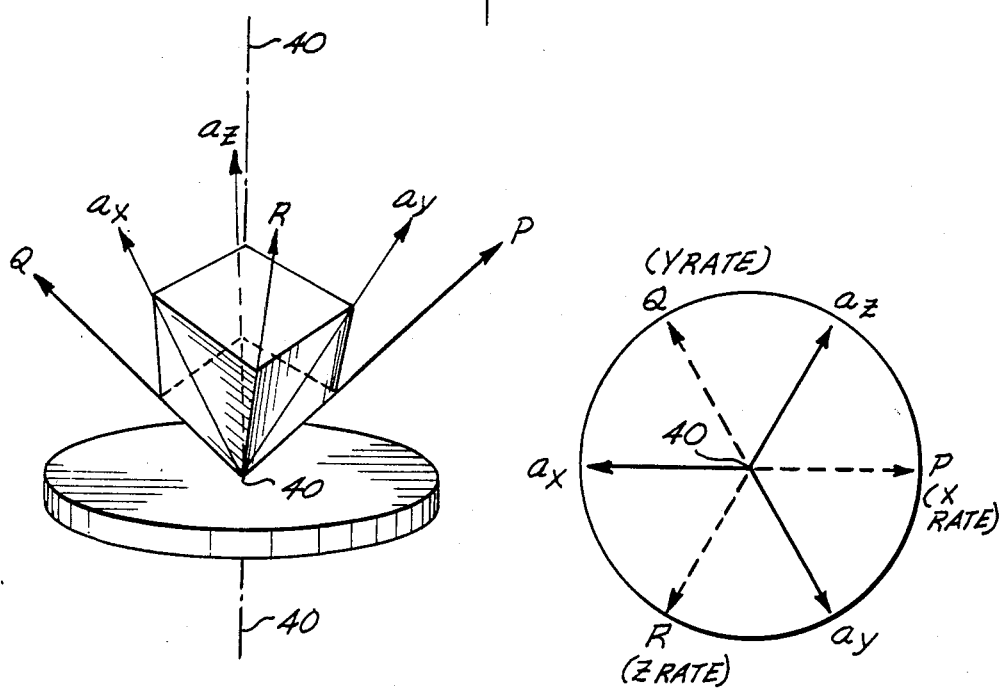
FIG. 6 is an isometric vector representation illustrating the relationship between the sensitive axes and orthogonal axes about which angular rate is determined in the first embodiments.
FIG. 7 is a plan view of the vector relationship shown in FIG. 6.

The relationship between the sensitive axes for each pair of accelerometers 26, 28 and 30 relative to the angular rate axes P, Q and R are graphically illustrated in FIGS. 6 and 7. As shown in these FIGURES, the acceleration sensitive axes of the pairs of accelerometers 26, 28 and 30 are indicated by the vectors $a_x$, $a_y$ and $a_z$, respectively, and the angular rates P, Q, and R, corresponding to the rate of angular rotation about the X, Y and Z axes are shown by the dashed vector lines. (In these figures, the length of the vectors and rate axes are entirely arbitrary and not intended to represent the magnitude of the vectors.) The values for angular rate are determined by adding the demodulated output signals from each accelerometer in the pairs of accelerometers 26, 28 and 30. As represented in FIG. 7, it may not be apparent that the angular rates P, Q and R, define three orthogonal axes. However, by showing the rate axes aligned along the edges of a three-dimensional (imaginary) cube converging at one of its corners, as illustrated in FIG. 6, the orthogonal relationship of the rate axes is readily perceived. As will be apparent by study of FIG. 6, the sensitive axes of each pair of accelerometers $a_x$, $a_y$ and $a_z$ are aligned with diagonals of the cube, forming an angle of 35.26° with the dither axis 40. Further, it will be apparent that the sensitive axes of the pairs of accelerometers are not orthogonal to each other, although they lie within orthogonal planes defined by the rate axes P, Q and R. Accordingly, it is relatively easy to transform the values for acceleration along the sensitive axes in terms of their component vectors to obtain orthogonal linear acceleration values along the rate axes, and to correct the rate of rotation determined by the non-orthogonal sensitive axes.

The transformations necessary to define linear acceleration along the X, Y and Z axes are defined by the sets of linear equations 1 and 2 as follows:

$$a_x = 0.707y + 0.707z$$

$$a_y = 0.707x + 0.707z$$

$$a_z = 0.707x + 0.707y \tag{1}$$

$$x = (a_y + a_z - a_x)/1.414$$

$$y = (a_x + a_z - a_y)/1.414$$

$$z = (a_x + a_y - a_z)/1.414 \tag{2}$$

where x, y and z are the linear accelerations aligned along the rate axes P, Q, and R, respectively.

In addition, the corrections for cross-axis angular acceleration in determining the true angular rates ar defined as follows:

$$\text{P correction} = Q - R$$

$$\text{Q correction} = R - P$$

$$\text{R correction} = P - Q \tag{3}$$

where the actual numeric value for the correction is equal to 0.8165, the cosine of 35.26°.

Since the angular rate axes are orthogonal to each other, it is not necessary to transform the results obtained for those rate axes as was done above for the linear acceleration along the X, Y and Z axes. Accordingly, the results of the calculation for angular rate are substantially more accurate than would be the case if such a transformation were required, due to gain sensitivity. Since the values for angular rate are normally required at a much higher accuracy than the values for linear acceleration, the configuration defined for the first embodiment provides a substantial advantage compared to other embodiments contemplated by the present invention in which the accelerometers would be mounted at other angles, such as 45° relative to the dither axis 40.

Figure 8:
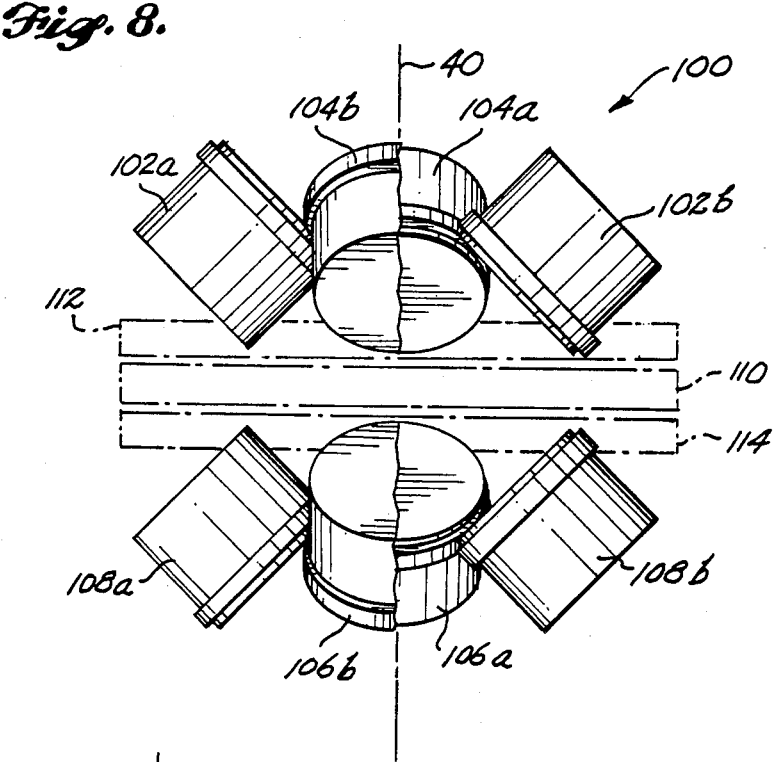
FIG. 8 is a schematic representation of a side view of the second embodiment of a rate sensor in which eight accelerometers are used to determine angular rate and linear acceleration along three orthogonal axes, wherein a portion of the foreground is broken away to show a pair of accelerometers which would otherwise be hidden.
Figure 10:
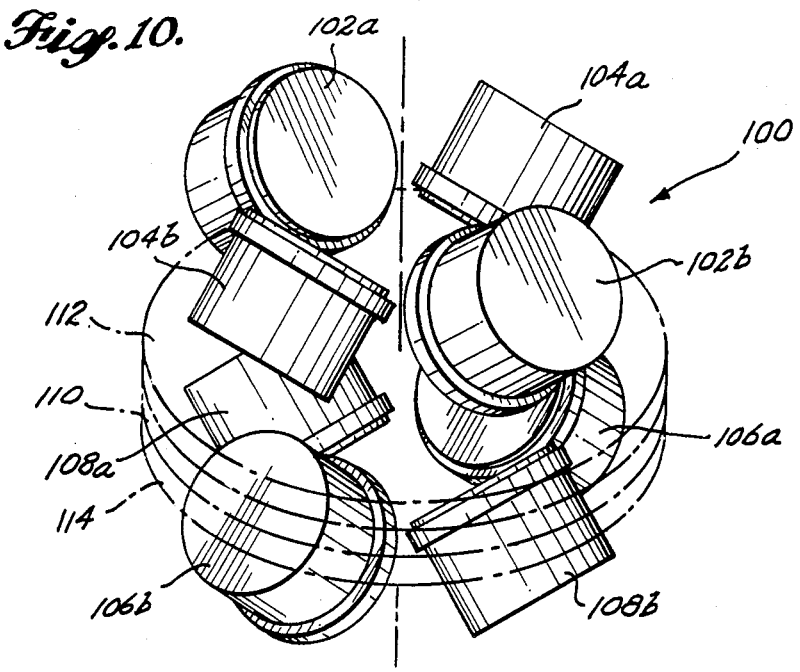
FIG. 10 is an isometric view schematically illustrating the second embodiment.
Figure 9:
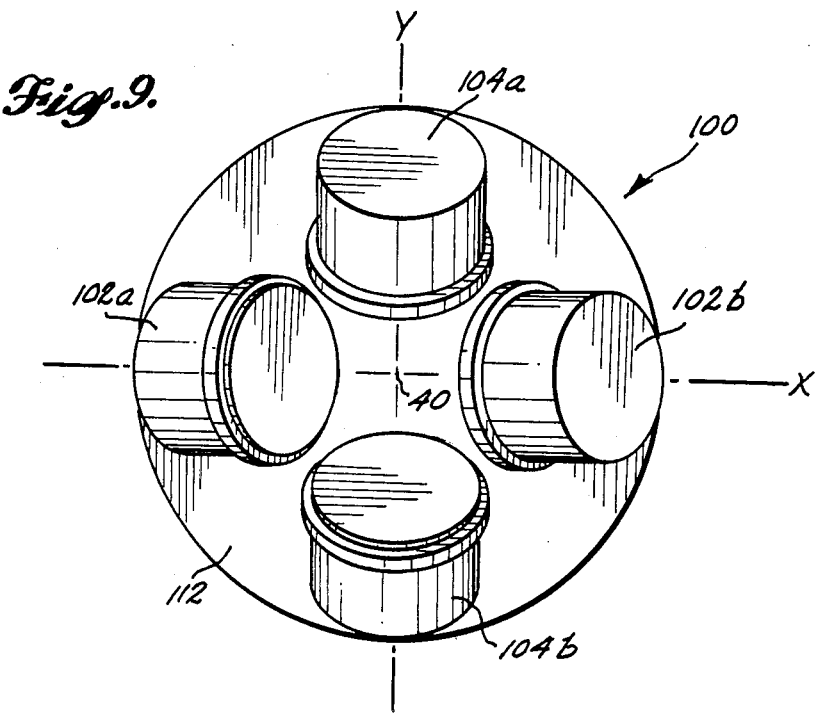
FIG. 9 schematically represents the second embodiment in a plan view.

FIGS. 8, 9 and 10 conceptually illustrate a second embodiment of the present invention, rate sensor 100, using four pairs of accelerometers 102, 104, 106 and 108. Rather than illustrating all the details of a complete rate sensor as was shown for the first embodiment in FIGS. 1-5, the illustrations of the second embodiment merely show the disposition of the accelerometers on upper and lower counter-rotating members 112 and 114, relative to a baseplate 110. It will be understood that the counter-rotating members and baseplate, electromagnetic coils, "E-coil," etc., as shown and described for rate sensor 10, may be provided in analogous fashion for rate sensor 100. The dither axis 40 passes through the centers of baseplate 110, and of counter-rotating members 112 and 114 normal to their upper and lower surfaces. The four accelerometers 102a, 102b, 104a and 104b rotate about dither axis 40 in one direction as accelerometers 106a, 106b, 108a, and 108b rotate in the opposite direction, in a reactionless drive similar to that of rate sensor 10.

Rate sensor 100 differes significantly from rate sensor 10 not only in the number of accelerometers used, but also in respect to the counter-rotating (frame) members on which each accelerometer of a pair is mounted. For example, as shown in FIGS. 8 and 10, accelerometer 102a is mounted with its sensitive axis aligned in parallel with the sensitive axis of accelerometer 102b; however, both accelerometers 102a and 102b are mounted on the same counter-rotating member 112 rather than on different counter-rotating members. Each of the other pairs of accelerometers 104, 106 and 108 are similarly configured so that both accelerometers of a like numbered pair have their sensitive axes aligned and are mounted to the same counter-rotating member. Also, each accelerometer of like numbered pairs has its sensitive axis pointing in an opposite direction, i.e., in antiparallel relationship to the other. The sensitive axes of the accelerometers in each pair form an angle of 45° relative to the dither axis 40, and as shown in FIG. 9, the accelerometers of each pair are disposed diametrically opposite each other at opposite sides of the counter-rotating member on which they are mounted. With respect to accelerometers 102a and 102b, linear acceleration, $A_u$, in the direction of their sensitive axes is defined by the equation:

$$A_u = A_a - A_b \quad (4)$$

where $A_a$ corresponds to the acceleration signal provided by accelerometer 102a, and $A_b$ corresponds to the acceleration signal from accelerometer 102b. Similarly, a Coriolis rate axis $\omega_u$ is formed from a cosine demodulation of the accelerometer signals for a sine wave dither drive signal, yielding the equation:

$$\omega_u = \cos\text{ demod } A_a + \cos\text{ demod } A_b \quad (5)$$

By combining similar signals from accelerometers 108a and 108b, which are mounted directly below accelerometers 102, on the lower counter-rotating member 114, the pointing angle change in the X axis can be eliminated. The term "pointing angle" refers to the angle subtended by the sensitive axes of the accelerometers as they are dithered back and forth. Since the upper rotating member dithers in an opposite or counter-rotating direction relative to the lower member, the effects of the change in the direction of the sensitive axes are equal and opposite for the upper and lower pairs of accelerometers associated with the same axis, such as 102 and 108, and therefore cancel. The Z component, aligned with the dither axis 40, remains in the X-Z plane at all times and does not change as the accelerometer pairs dither back and forth. By combining the resulting demodulated signals from the upper and lower pairs of accelerometers, the following relationships are obtained;

$$\omega_x = P = -(*\omega_u + \omega_l) \quad (6)$$

$$\omega_z = R = \omega_u - \omega_l \quad (7)$$

By analogy, accelerometers 104a and 104b and 106a and 106b can be used to develop the angular rate relative to the Y axis, Q in a similar fashion.

Because the upper and lower rotating members are counter-rotating back and forth in a sine wave dither motion, the average pointing direction of both the rate and acceleration axes stays exactly aligned with the X and Y axes at each instant of time. This factor reduces the cross-axis acceleration and rate coupling errors associated with more conventional vibrating or rotating rate sensors. In addition, since accelerometers in each pair are mounted on the same counter-rotating member, sinusoidal rate component error in the linear channels are eliminated. In addition, the linear acceleration component errors in the rate channels cancel when the demodulated output signals from each accelerometer are added.

It is also possible to mount pairs of accelerometers in other dispositions on the counter-rotating members, as for example with pairs disposed at 90° spaced-apart intervals around each rotating member. However, such a mounting disposition is not preferred, because the upper and lower counter-rotating members may have small, dissimilar mechanical motions which may degrade the cancellation of cross-coupling errors discussed above.

The first embodiment of the present invention is preferred to the second embodiment for several reasons, other than the readily apparent reason that fewer accelerometers are required to implement it. With respect to FIGS. 11 and 12, a substantial advantage of the first embodiment relative to the second is graphically illustrated. As shown in FIG. 11, one pair of accelerometers 102a and 102b is mounted on an upper counter-rotating member 112, and the accelerometers have their sensitive axes 102a' and 102b' aligned with each other, forming a 45° angle relative to the dither axis 40. Similarly, accelerometers 108a and 108b are disposed on a lower counter-rotating member 114 with their sensitive axes 108a and 108b aligned antiparallel to each other, at 45° to dither axis 40. The centers of percussion of each of the accelerometers 102 and 108 are disposed at a radius r from the dither axis 40, and the sensitive axis 102a' is separated by a distance d from the sensitive axis 102b'. When accelerometers 102a and 102b are dithered about axis 40, their output signal will include an error component proportional to the angular acceleration of the accelerometers about an axis perpendicular to both the dither motion and the acceleration sensitive axes, which is proportional to the distande d between their centers of percussion. Ignoring this error component results in a relatively large "noise" term in the bias signal associated with each accelerometer pair. Clearly, the distance d may be reduced by mounting accelerometers 102a and 102b closer to the dither axis 40; however, reducing the radius r has the effect of reducing the contribution of Coriolis rate to the output signal produced by each accelerometer. This will be apparent, since as the accelerometers are moved closer to the dither axis, the dither motion amplitude becomes relatively less. Since sensitivity to Coriolis acceleration is important, it is not practical to reduce the effects of the angular acceleration errors created by the relatively large displacement d between the centers of percussion of accelerometers 102a and 102b by moving them closer to the dither axis.

As shown in FIG. 12, the configuration of rate sensor 10, wherein accelerometers 30a and 30b are mounted on counter-rotating frames (represented by counter-rotating members 112 and 114) minimizes the distance $d_1$ between the centers of percussion of the two accelerometers. Since accelerometer 30a is mounted directly above accelerometer 30b and counter-rotates relative to it, cross-axis coupling between the accelerometers is matched and eliminated by combining their output signals. The magnitude of the dimension $d_1$ can be reduced by keeping the accelerometers as close together as possible, i.e, by minimizing the vertical separation between counter-rotating members 112 and 114. Unlike the second embodiment shown in FIG. 11, accelerometers 30a and 30b may be moved closer together, reducing $d_1$ but not affecting $r_1$ and $r_2$, the distances between the centers of percussion of the accelerometers and the dither axis. By reducing $r_2$ compared with $r_1$, the $d_1$ term can be made nominally zero, effectively canceling out the error components due to angular acceleration. Furthermore, by tilting the sensitive axes of accelerometers 30a and 30b relatively closer to the dither axis 40, the value of $d_1$ becomes less even though $r_1$ is equal to $r_2$. Since the accelerometers in the first embodiment are all mounted at an angle of 35.26° relative to the dither axis rather than the substantially larger 45° angle of the accelerometers in the second embodiment, they have even less sensitivity to centrifugal acceleration errors.

Turning now to FIG. 13, a system for processing the signals output from each pair of accelerometers in the rate sensor is shown, with respect to a single pair of accelerometers 26a and 26b. These accelerometers produce an output signal proportional to the acceleration to which they are exposed along their sensitive axis, containing components of both angular rate and linear acceleration. The signals output from accelerometers 26a and 26b are conveyed by leads 120 and 122, respectively, to counters 124 and 126. These counters are operative to demodulate the signal by comparison with a signal SGN $\cos\omega t$ input via leads 128 from a timing and control circuit 130. The output from counters 124 and 126 is input over data lines 132 to a microprocessor 134. The microprocessor includes both read-only memory (ROM) in which a digital program is stored for processing the information and random access memory (RAM), which provides temporary storage for data. Microprocessor 134 processes the information provided by counters 124 and 126 to determine both the angular rate and linear acceleration components of the signals output from accelerometers 26a and 26b (and from each of the other pairs of accelerometers comprising the rate sensor). Microprocessor 134 also provides a timing and control signal through a conductor 136 to a timing and control block 130, which controls drive signal generator 138, in response to a signal from "E-coil" 66, conveyed over leads 140. Drive signal generator 138 produces a sinusoidally varying current to energize electromagnetic coils 42 (not shown in FIG. 13) to reactionlessly dither upper frame member 20 and lower frame member 22 in counter-rotation relative to each other.

While the present invention has been disclosed with respect to the preferred embodiments, those of ordinary skill in the art will appreciate that modifications to the apparatus disclosed hereinabove may be made within the scope of the claims that follow below. Accordingly, it is not intended that the scope of this invention be in any way limited by the disclosure, but instead that it be determined solely by reference to the claims.

The embodiments of the invention in which an exclusive property or privilege is claimed are defined as follows:

1. Apparatus for producing an output signal indicative of the angular rate of rotation of a body about a prime axis, comprising:
   (a) a first accelerometer and a second accelerometer, each having an acceleration sensitive axis and operative to produce a signal proportional to an acceleration directed along said axis, the first and second accelerometers being mounted on opposed support members that are pivotally connected to the body, the acceleration sensitive axes of the first and second accelerometers being generally aligned in parallel;
   (b) a motor connected to counter-rotate the opposed support members about a common pivot axis, rotation of the body about the prime axis subjecting the counter-rotating accelerometers to a Coriolis acceleration that is a function of said angular rate of rotation and causing the accelerometers to produce a signal proportional to a component of the Coriolis acceleration that is aligned with their acceleration sensitive axes; and
   (c) means for combining the signals produced by the first and the second accelerometers to produce the output signal indicative of said angular rate of rotation of the body about the prime axis.

2. The apparatus of claim 1, wherein the motor comprises a first and a second electromagnetic attractor, the first and the second electromagnetic attractors being operative to counter-rotate the opposed support members in opposite relative directions.

3. The apparatus of claim 2, wherein the first and the second electromagnetic attractors are energized sequentially, causing the opposed support members to dither back and forth in counter-rotating motion relative to each other.

4. The apparatus of claim 2, wherein the first and the second electromagnetic attractors are energized with a periodically varying current.

5. The apparatus of claim 2, wherein the first and the second electromagnetic attractors each comprise an electromagnetic coil attached to one of the opposed support members and a pole piece attached to the other opposed support member.

6. The apparatus of claim 1, further comprising a baseplate disposed between the opposed support members and connected to the body, the opposed support members being pivotally connected to the baseplate.

7. The apparatus of claim 6, further comprising a plurality of flexures aligned with the common pivot axis and connecting the opposed support members to the baseplate at a plurality of points spaced apart around said common pivot axis.

8. The apparatus of claim 7, wherein the flexures each comprise an elongate strip having a planar surface radially aligned about the common pivot axis, opposite ends of each strip being connected to the opposed support members, and a point intermediate each end being connected to the baseplate.

9. The apparatus of claim 1, further comprising means for sensing the angular displacement of the first accelerometer relative to the second accelerometer and producing a signal indicative of said angular displacement.

10. The apparatus of claim 9, wherein the means for combining the signals are connected to receive the signal indicative of angular displacement and are further operative to control the amplitude and phase of a periodic drive current applied to energize the motor, as a function of said signal.

11. The apparatus of claim 1, wherein the acceleration sensitive axes of the first and the second accelerometers define an actue angle with the common pivot axis of the opposed support members and are substantially orthogonal to the prime axis.

12. The apparatus of claim 1, wherein the means for combining the signals are further operative to produce an output signal indicative of the magnitude of acceleration to which the body is subjected in alignment with the acceleration sensitive axes of the first and the second accelerometers.

13. The apparatus of claim 1, further comprising a plurality of pairs of accelerometers, each pair having associated acceleration sensitive axes disposed non-parallel to the acceleration sensitive axes of the first and second accelerometers and to the acceleration sensitive axes of at least one other pair, one accelerometer of each pair being mounted on one of the opposed support members so that the acceleration sensitive axis of said one accelerometer is generally parallel to the acceleration sensitive axis of the other accelerometer of the pair, each pair of accelerometers being associated with a rate axis orthogonal to the prime axis and producing a signal corresponding to the Coriolis acceleration to which said pair of accelerometers is subjected as the motor counter-rotates the opposed support members and the body is subjected to rotation about the associated rate axis, the means for combining signals being in receipt of said signal produced by the pairs of accelerometers and operative to produce an output signal indicative of the angular rate of rotation about each of the associated angular rate axes.

14. The apparatus of claim 13, wherein the means for combining signals are further operative to produce a signal indicative of the acceleration to which the body is subjected along each of the acceleration sensitive axes of the pairs of accelerometers.

15. Apparatus for sensing an angular rate of rotation about each of a plurality of prime axes, comprising:
(a) a supporting base;
(b) a first frame member and a second frame member pivotally connected to the supporting base, so as to rotate about a common axis;
(c) a plurality of pairs of accelerometers, each accelerometer having an acceleration sensitive axis, each pair of accelerometers being associated with one of the plurality of prime axes about which the angular rate of rotation is sensed, the pairs of accelerometers being mounted on the first and the second frame members so that the acceleration sensitive axes of the two accelerometers comprising a pair are generally in parallel alignment;
(d) driving means, for counter-rotating the first frame member about the common axis relative to the second frame member, causing each accelerometer to rotate about the common axis, and causing each pair of accelerometers to be subjected to a Coriolis acceleration proportional to the angular rate of rotation about the prime axis with which it is associated so that each accelerometer produces an output signal that is a function of said Coriolis acceleration; and
(e) signal processing means, connected to the pairs of accelerometers, for processing the output signals produced by the accelerometers to determine the angular rate of rotation about each of the prime axes.

16. The apparatus of claim 15, wherein the driving means comprise a first electromagnetic coil connected to one of the first and second frame members and a first pole piece connected to the other of the first and second frame members.

17. The apparatus of claim 16, further comprising a second electromagnetic coil connected to one of the first and second frame members and a second pole piece connected to the other of the first and second frame members, the second electromagnetic coil and second pole piece being sequentially energized and providing a driving force directed in opposite angular direction relative to the driving force of the first electromagnetic coil and first pole piece.

18. The apparatus of claim 16, wherein the first electromagnetic coil is energized with a periodically varying current.

19. The apparatus of claim 17, wherein the first and second electromagnetic coils are energized with a periodically varying current operative to counter-rotate the first frame member in a first direction and then in a second direction opposite the first, relative to the second frame member, so that the first and second frame members dither back and forth in counter-rotation relative to each other.

20. The apparatus of claim 19, further comprising means for sensing the angular displacement of the first frame member relative to the second frame member and producing a signal indicative of the angular displacement.

21. The apparatus of claim 20, wherein the signal processing means are connected in receipt of the signal indicative of angular displacement and are further operative to control the amplitude and phase of the periodically varying current used to energize the first and second electromagnetic coils, as a function of said signal.

22. The apparatus of claim 15, wherein the supporting base comprises a baseplate disposed intermediate the first and the second frame members.

23. The apparatus of claim 22, further comprising a plurality of flexures connecting the first and the second frame members to the baseplate.

24. The apparatus of claim 23, wherein the flexures each comprise a plurality of elongate flat strips having a planar surface aligned with the common axis of the first and second frame members, opposite ends of said strips being connected to the first and the second frame members and a point intermediate the ends of each strip being connected to the baseplate.

25. The apparatus of claim 22, wherein the baseplate comprises a plurality of tabs extending radially outward from the common axis of the first and second frame members, the tabs being connected to a body subject to rotation about the prime axes.

26. The apparatus of claim 15, wherein one accelerometer of each pair is disposed on the first frame member and the other accelerometer of each pair is disposed on the second frame member.

27. The apparatus of claim 26, wherein the prime axes are orthogonal and wherein the acceleration sensitive axes of the pairs of accelerometers define an acute angle with the common axis of the first and second frame members and lie within orthogonal planes defined by the prime axes.

28. The apparatus of claim 26, comprising three pairs of accelerometers.

29. The apparatus of claim 26, wherein the acceleration sensitive axes of the pairs of accelerometers are orthogonal, each forming an acute angle with the common axis of the first and the second frame member.

30. The apparatus of claim 26, wherein the prime axes lie in orthogonal planes defined by the acceleration sensitive axes of the pairs of accelerometers, the orthogonal planes being defined by the acceleration sensitive axes of the pairs of accelerometers.

31. The apparatus of claim 15, wherein both accelerometers of each pair are mounted on the same one of the first and second frame members.

32. The apparatus of claim 15, further comprising four pairs of accelerometers.

33. The apparatus of claim 15, further comprising link means connecting the first and second frame members to the supporting base, for permitting only rotational motion of the first and the second frame members about their common axis relative to the supporting base and for coupling motion of the supporting base to both the first and the second frame members.

34. The apparatus of claim 15, wherein the signal processing means are further operative to process the output signals produced by the accelerometers to determine a linear acceleration along three orthogonal axes.

35. A method for producing an output signal indicative of the angular rate of rotation of a body about a plurality of prime axes, comprising the steps of:
(a) mounting a plurality of accelerometer pairs so that an acceleration sensitive axis of each accelerometer in the pair is generally parallel to that of the other, the accelerometers being operative to produce a signal proportional to an acceleration directed along their sensitive axes;
(b) counter-rotating the accelerometer pairs on a first and a second frame member, about a common pivot axis; and
(c) combining the signals produced by the pairs of accelerometers to produce a vector sum signal corresponding to each prime axis, said vector sum being proportional to the angular rate of rotation of the body about said prime axis.

36. The method of claim 35, further comprising the step of mounting one accelerometer of each pair on one of the first and the second frame members and mounting the other accelerometer of each pair on the other of the first and the second frame members, so that the accelerometers comprising each pair are counter-rotated relative to each other.

37. The method of claim 35, further comprising the step of mounting both accelerometers comprising a pair on the same one of the first and the second frame members, on opposite sides of the common pivot axis.

38. The method of claim 35, wherein the pairs of accelerometers are incrementally counter-rotated back and forth about the common axis in a dither motion.

39. The method of claim 35, wherein the pairs of accelerometers are mounted so that their acceleration sensitive axes define an acute angle with the common pivot axis.

40. The method of claim 35, wherein the prime axes are orthogonal to each other and define orthogonal planes in which the acceleration sensitive axes of the pairs of accelerometers lie.

41. The method of claim 35, further comprising the step of combining the signals produced by the pairs of accelerometers to produce a signal corresponding to the acceleration of the body along at least one of a plurality of orthogonal axes.

42. The method of claim 35, further comprising the steps of sensing the angular displacement of the first frame member relative to the second frame member, and producing a signal indicative of said angular displacement.

43. The method of claim 42, further comprising the step of applying a periodically varying current to drive the first and the second frame members in counter-rotating motion.

44. The method of claim 43, further comprising the step of controlling the phase and the amplitude of the periodically varying current as a function of the angular displacement indicating signal.

45. The method of claim 35, wherein the first and the second frame members are connected to a supporting base by a plurality of flexures.

46. The method of claim 45, wherein the flexures comprise elongate flat strips, opposite ends of each being connected to the first and the second frame members, and a point intermediate the ends of the strips being connected to the supporting base.

47. The method of claim 45, wherein the flexures have planar surfaces and are mounted so that their planar surfaces are radially aligned about the common pivot axis.

* * * * *